United States Patent
Misono et al.

[11] 4,070,749
[45] Jan. 31, 1978

[54] METHOD OF MANUFACTURING LIQUID CRYSTAL DISPLAY DEVICES

[75] Inventors: Masayoshi Misono, Chiba; Masaharu Koyama; Tutomu Asida, both of Mobara, all of Japan

[73] Assignee: Hitachi, Ltd., Tokyo, Japan

[21] Appl. No.: 701,141

[22] Filed: June 30, 1976

[30] Foreign Application Priority Data
July 4, 1975 Japan .................................. 50-81827

[51] Int. Cl.² ............................................... G02F 1/13
[52] U.S. Cl. ........................................ 29/592 R; 53/8; 228/124; 228/219; 350/160 LC
[58] Field of Search ................. 29/592; 228/121, 124, 228/184, 219; 350/160 LC; 53/8, 80

[56] References Cited

U.S. PATENT DOCUMENTS

| | | | |
|---|---|---|---|
| 3,751,137 | 8/1973 | Fitzgibbons et al. | 350/160 LC |
| 3,808,769 | 5/1974 | Gardiner et al. | 350/160 LC X |
| 3,926,502 | 12/1975 | Tanaka | 350/160 LC |
| 3,970,363 | 7/1976 | Geyer et al. | 350/160 LC |

FOREIGN PATENT DOCUMENTS

| | | | |
|---|---|---|---|
| 2,331,567 | 1/1974 | Germany | 350/160 LC |
| 1,381,428 | 1/1975 | United Kingdom | 350/160 LC |

*Primary Examiner*—Victor A. DiPalma
*Attorney, Agent, or Firm*—Charles E. Pfund

[57] ABSTRACT

A pair of insulating substrates are maintained at a definite spacing, at least one of the substrates being transparent and provided with transparent electrode, the periphery of the substrates is sealed except a liquid crystal inlet opening to form a cell, a liquid crystal is filled into the cell and the opening is sealed with a molten solder in an inert atmosphere.

11 Claims, 5 Drawing Figures

METHOD OF MANUFACTURING LIQUID CRYSTAL DISPLAY DEVICES

BACKGROUND OF THE INVENTION

This invention relates to a method of manufacturing a liquid crystal display device.

A liquid crystal display device is generally manufactured by disposing a pair of insulating substrates in parallel relationship at a definite spacing and then sealing the periphery of the substrates with a peripheral sealing member such as frit glass or solder glass except a small inlet opening for filling with a liquid crystal, thus forming a liquid crystal cell. At least one of the substrates is transparent for displaying patterns and, a flat transparent electrode is formed on the inner surface of the transparent insulating substrate. After filling the liquid crystal into the cell through the inlet in a well-known manner, the inlet opening is sealed by a liquid crystal inlet sealing agent to complete a liquid crystal display device.

Since a liquid crystal is liable to be affected by moisture, oxygen in the air, and heat, and is chemically active, the peripheral sealing member is required to be impervious to water. Moreover, as organic substances can not satisfy these requirements, in inorganic substances such as frit glass is used. However, after the liquid crystal has been filled in the cell, it is impossible to use frit glass to seal the liquid crystal inlet opening. Because it is necessary to use an elevated temperature of order of 400° C to 500° C for the treatment of the frit glass, the liquid crystal decomposes at a temperature within the above range. For this reason, it is necessary to use an inorganic sealing agent other than frit glass for sealing the liquid crystal inlet opening. A method of sealing has been proposed wherein a solder containing a small amount of transition elements and sold under a trade name of Cerasolzer is directly applied to the glass by ultrasonic soldering technique. However, this method is defective in that fine particles of the solder enter into the liquid crystal thus forming a black sludge or causing short circuit of the electrodes. This, of course, impairs patterns to be displayed.

According to another method, a paste containing Ag-Pd, Au-Pd or the like is backed on the area surrounding the inlet opening and then soldering is effected. However, this paste requires a baking temperature of 500° C to 650° C thus degrading the liquid crystal. If baked at a lower temperature not to soften the peripheral sealing member comprising frit glass, bonding strength would be deficient.

To solve these problems a method has been proposed wherein a metal film is vapour deposited onto the area surrounding the liquid crystal inlet opening and then the opening is sealed with an eutectic solder consisting of 63% of tin and 37% of lead which solidifies, upon cooling, in an eutectic state. When a mixture (or alloy) of nickel and chromium is vapour deposited about the liquid crystal inlet opening, a metal film is formed containing chromium having lower evaporation temperature at the inner portion and nickel having higher evaporation temperature at the outer portion. Chromium has a strong bonding strength to glass. The bonding strength of nickel to glass is not so high but it can be soldered satisfactorily thereby enabling the application of the eutectic solder on the vapour deposited metal film. When a film of gold is formed on the metal film, more satisfactory soldering can be made and oxidation of the metal film can be prevented.

However, when the soldering operation is performed in the air, the surface of the resulting solder film becomes irregular containing many projections and depressions, the largest projection being formed at a point where a soldering iron is removed from the soldered film. This is caused by the fact that the surface of the molten solder is oxidized and increases its viscosity more than in the inner side. The molten solder having an increased viscosity tends to follow the escaping soldering iron. As will be described later with reference to the accompanying drawing, such large projection will rupture a part of the insulating substrates close to the soldered portion sealing the liquid crystal inlet, on account of difference in thermal expansion coefficient between the insulating substrate and the solder. Moreover such irregular surface decreases the dimensional accuracy of the liquid crystal device.

SUMMARY OF THE INVENTION

Accordingly, it is an object of this invention to provide a method of manufacturing a liquid crystal display device having a durable seal for the liquid crystal inlet opening.

Another object of this invention is to provide an improved method of manufacturing a liquid crystal display device having a high dimensional accuracy.

According to this invention there is provided a method of manufacturing a liquid crystal display device of the class wherein a dam made of frit glass having a liquid crystal inlet opening is formed on one of paired insulating substrates, at least one of the substrates being transparent and provided with a transparent electrode, a resultant structure and the other insulating substrate are put together at the dam and the frit glass is baked at a predetermined temperature to complete a liquid crystal cell, area surrounding the liquid crystal inlet opening is metalized, a liquid crystal is filled into the cell through the liquid crystal inlet opening, and then the liquid crystal inlet opening is sealed with a molten sealing material, characterized in that the sealing for the liquid crystal inlet opening is carried out in an atmosphere in which the surface portion and the inner portion of the molten sealing material have substantially the same viscosity.

DESCRIPTION OF THE PREFERRED EMBODIMENT

Figure 1:
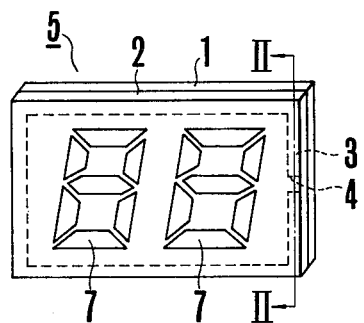
FIG. 1 is a perspective view showing one example of a liquid crystal display device to which the method of this invention is applicable.
Figure 2:
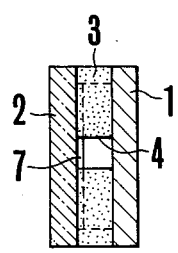
FIG. 2 is a sectional view of the liquid crystal display device shown in FIG. 1 taken along a line II—II.

A liquid crystal display device especially a cell 5 shown in FIG. 1 comprises a pair of insulating substrates 1 and 2 disposed in parallel with a definite spacing (for example 4 to 15 μ) therebetween and a peripheral sealing member or a C-shaped dam 3 formed along the periphery of the substrate except a liquid crystal inlet opening 4. The peripheral sealing member 3 also acts as a spacer between the substrates. Actually, the C-shaped dam 3 made of frit glass having a liquid crystal inlet opening 4 is formed on at least one of the insulating substrates 1 and 2 by, for example, screen-printing. A resultant structure and the other insulating substrate are put together at the dam and thereafter, the frit glass is baked at a temperature within the range of 400° C to 500° C to make seal for the insulating substrates, thereby completing the cell 5. Area surrounding the liquid crystal inlet opening is metalized with, for example, a mixture of nickel and chromium along with gold to ensure ground for soldering. In the example shown, the substrate 2 is made of a transparent insulator, for example a sheet of glass and a transparent electrodes 7 comprising a plurality of segments are formed on the inner surface of transparent substrate 2. The other substrate 1 may be opaque or transparent depending upon the manner of display.

A liquid crystal is filled into the cell 5 through the inlet opening 4 in a manner well known in the art. After filling the liquid crystal, the inlet opening is sealed to form a liquid crystal display device.

Figure 3:
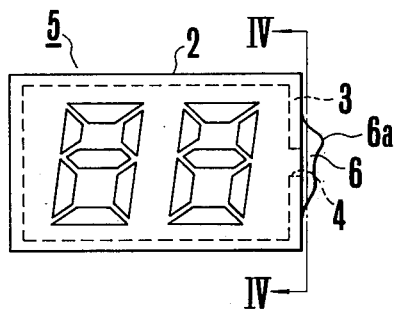
FIG. 3 is a plan view for explaining a prior art method of sealing the liquid crystal inlet opening.
Figure 4:
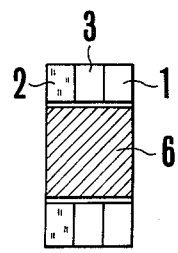
FIG. 4 is a sectional view of the device shown in FIG. 3 taken along a line IV—IV and, FIG. 5 is a plan view for explaining the method of sealing the liquid crystal inlet opening according to this invention.

Preferably, the sealing for the liquid crystal inlet opening is made by using an eutectic solder. As exaggeratedly shown in FIGS. 3 and 5, solder 6 is applied in and about the opening 4. However, when the soldering operation is performed in the air, the surface of the soldered portion 6 becomes irregular, the largest projection 6a being formed at a point where a soldering iron is separated away from the soldered portion. In case of dip soldering, a similar projection takes place when a soldered member is pulled out of a solder bath. The presence of such projection results in the following two problems.

One problem is the tendency of destroying the substrate near the soldered portion 6 which is caused by the following reason.

As above described, an eutectic solder is usually used for sealing the liquid crystal inlet opening. Such solder has an excellent wet property and has a coefficient of thermal expansion of about $270 \times 10^{-7}/°C$ and a melting temperature of about 200° C. Soda-lime glass usually utilized as the insulating substrates has a coefficient of expansion of about $92 \times 10^{-7}/°C$. In consequence, when a sealed device is cooled to room temperature, a thermal stress is created between the soldered portion 6, the insulating substrates 1 and 2 and the peripheral sealing member 3, such thermal stress being proportioned to the amount of the solder and the Youngs modulus thereof. As a result of experiment, it was found that the stress increases exponentially with the amount of the solder, and also that fracture begins in the substrate near the localized maximum projection 6a.

The second defect is that presence of the localized projection 6a degrades the dimensional accuracy of the completed device. Where the liquid crystal device is used in miniature devices such as a wrist watch, an extremely high dimensional accuracy is required so that the presence of the projection makes it impossible to obtain such high dimensional accuracy.

As described above, the projection 6a is formed by the oxidation of the surface of the molten solder and increase in the viscosity. According to this invention, this defect is eliminated by carrying out the soldering operation in an inert gas, for example in an atmosphere of dry nitrogen. According to this method, since the molten solder does not oxidize, the viscosity of the surface of the molten solder is the same as that of the inner portion. Accordingly, it is possible to separate the soldering iron or the like from the soldered portion without forming a projection, i.e. a locally hardened part. In one example, the soldering temperature was 200° C. More particularly, a liquid crystal cell filled with a liquid crystal and a soldering iron are placed in a hood box filled with an inert gas, and the energization and manipulation of the soldering iron and supply of the solder are controlled externally. In this case, it is essential that the pressure of the inert gas should be equal to one atmospheric pressure, in other words should be equal to the pressure in the liquid crystal cell before sealing. If there is a pressure difference, the molten solder would enter into the cell or the liquid crystal in the cell would flow out to the outside. By accurately regulating the temperature of a small soldering iron to a definite value, preferably about 50° C above the melting point of the solder used, it is possible to make substantially equal the amount of the solder fed and the amount of the molten solder depositing on the portion to be sealed. In one example the difference between these amounts was approximately 10%. In order to regulate the soldering iron temperature, a chromel-alumel thermocouple, for example, is placed in contact with the tip of the soldering iron and the soldering iron is supplied from a stabilized AC source. With the eutectic solder containing 63% tin and 37% lead, it is preferable to set the soldering iron tip temperature to about 230° C for sealing the inlet opening of about $(4 - 15 \mu) \times 1.5$ mm cross section with about $4$ mg/$5 \times 1.4$ mm$^2$ solder in nitrogen atmosphere.

Figure 5:
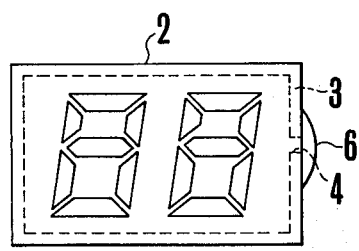

FIG. 5 shows one example of a liquid crystal display device sealed by soldering in an inert gas. As shown, the soldered portion 6 has a gently curved surface. Thus, it can be noted that no oxidization in the solder surface attributes to no formation of the projection, the surface of the soldered portion is smooth, that is the surface is a free surface, and the height thereof is within a prescribed limit so that high dimensional accuracy can be assured. Moreover, since the solder surface does not oxidize, the Youngs modulus does not increase thus assuring a strong seal.

Although in the foregoing description an eutectic solder was used, other solders having similar property such as, for example solders respectively containing indium and silver, cadmium, and bismuth can be used. Further, it should be understood that the method of this invention is also applicable to other device comprising spaced glass substrates and liquid sealed therebetween, for example, an electrochromic device, an electrophoresis device, a quasi-liquid crystal such as Varad (trade name) device, etc. Accordingly, the term "liquid crystal cell" is used herein to cover also these similar devices.

As above described, according to the method of this invention there is no fear of forming a projection on the surface of the soldered portion, that is the soldered portion has a free surface. Further, it is possible to prevent fracture of the soldered portion due to thermal stress and to maintain a constant dimensional accuracy.

What is claimed is:

1. A method of manufacturing a liquid crystal display device comprising the steps of forming a dam made of frit glass having a liquid crystal inlet opening on at least one of paired insulating substrates, at least one of the substrates being transparent and provided with a transparent electrode, putting together a resultant structure and the other insulating substrate at the dam and baking the frit glass at a predetermined temperature to complete a liquid crystal cell, metalizing area surrounding the liquid crystal inlet opening, filling a liquid crystal into said cell through said opening, and sealing said liquid crystal inlet opening with a molten sealing material in an atmosphere in which the surface portion and the inner portion of said molten sealing material have substantially the same viscosity.

2. In an improved method of manufacturing a liquid crystal display device comprising the steps of forming a dam made of frit glass having a liquid crystal inlet opening on at least one of paired insulating substrates, at least one of the substrates being transparent and provided with a transparent electrode, putting together a resultant structure and the other insulating substrate at the dam and baking the frit glass at a predetermined temperature to complete a liquid crystal cell, metalizing area surrounding the liquid crystal inlet opening, filling a liquid crystal into said cell through said opening, and sealing said liquid crystal inlet opening with a molten sealing material wherein the improvement comprises effecting said sealing in a non-oxidizing environment.

3. The method of claim 2 wherein said non-oxidizing environment is an inert gas atmosphere.

4. The method of claim 2 wherein said sealing material is a solder.

5. The method of claim 4 wherein said solder is a eutetic solder.

6. The method of claim 5 wherein said eutetic solder is a predetermined quantity to form a predetermined seal size.

7. The method of claim 2 wherein said sealing material is a solder and said non-oxidizing environment is an inert gas.

8. The method of claim 7 wherein said solder is a eutectic solder and a predetermined quantity.

9. In an improved method of sealing a metallized filling hole in a liquid crystal cell, the improvement comprising sealing said hole with solder in a non-oxidizing environment.

10. The method of claim 9 wherein said environment is an inert gas atmosphere and said solder is a eutectic solder.

11. The method of claim 10 wherein said eutectic solder is a predetermined quantity to form a predetermined seal size.

* * * * *